United States Patent
Woo et al.

(10) Patent No.: US 12,362,442 B2
(45) Date of Patent: Jul. 15, 2025

(54) BUTTON CELL

(71) Applicant: SAMSUNG SDI CO., LTD., Yongin-si (KR)

(72) Inventors: Byongchul Woo, Yongin-si (KR); Kijun Kim, Yongin-si (KR); Jun Ho Lee, Yongin-si (KR); Seunghyup Ha, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 19 days.

(21) Appl. No.: 17/178,559

(22) Filed: Feb. 18, 2021

(65) Prior Publication Data

US 2021/0408649 A1  Dec. 30, 2021

(30) Foreign Application Priority Data

Jun. 26, 2020 (KR) .......... 10-2020-0078578

(51) Int. Cl.
*H01M 50/547* (2021.01)
*H01M 50/533* (2021.01)

(52) U.S. Cl.
CPC ....... *H01M 50/547* (2021.01); *H01M 50/533* (2021.01)

(58) Field of Classification Search
CPC .......................... H01M 50/547; H01M 50/533
See application file for complete search history.

(56) References Cited

U.S. PATENT DOCUMENTS

| | | | |
|---|---|---|---|
| 7,625,666 B2 | 12/2009 | Shose et al. | |
| 2006/0216581 A1 | 9/2006 | Hwang et al. | |
| 2008/0057374 A1* | 3/2008 | Kurosawa ......... | H01M 8/04201 429/513 |
| 2008/0081253 A1* | 4/2008 | Shose ................. | H01M 50/169 429/162 |

(Continued)

FOREIGN PATENT DOCUMENTS

| | | |
|---|---|---|
| CN | 102315027 A | 1/2012 |
| CN | 103069651 B | 3/2015 |

(Continued)

OTHER PUBLICATIONS

English Machine Translation of Yeon et al. (KR 101483422 B1) (provided in IDS filed by Applicant on Feb. 18, 2021) (Year: 2013).*

(Continued)

*Primary Examiner* — Matthew T Martin
*Assistant Examiner* — Krishna R Hammond
(74) *Attorney, Agent, or Firm* — Womble Bond Dickinson (US) LLP

(57) ABSTRACT

A rechargeable battery includes: an electrode assembly including a first electrode, a second electrode, and a separator between the first electrode and the second electrode; a case connected to the first electrode to house the electrode assembly and including an opening to expose the electrode assembly; a cap plate coupled with the case to cover an outer region of the opening and including a through-hole to expose a center region of the opening; and a terminal plate bonded to and insulated from the cap plate to cover the through-hole and connected to the second electrode, and the outer surface of the case has a first protrusions-and-depressions shape.

14 Claims, 5 Drawing Sheets

(56) References Cited

U.S. PATENT DOCUMENTS

| | | | |
|---|---|---|---|
| 2013/0143454 A1 | | 6/2013 | Onuma et al. |
| 2015/0243941 A1 | | 8/2015 | Kang |
| 2017/0352847 A1 | * | 12/2017 | Klee .................... H01M 50/50 |
| 2019/0067665 A1 | * | 2/2019 | Jang .................... H01M 50/538 |
| 2019/0229383 A1 | * | 7/2019 | Hildinger .......... H01M 10/6555 |
| 2020/0035960 A1 | | 1/2020 | Nakano et al. |

FOREIGN PATENT DOCUMENTS

| | | | | |
|---|---|---|---|---|
| CN | 108140758 A | * | 6/2018 | ........ H01M 10/0427 |
| JP | 2000-133243 A | | 5/2000 | |
| JP | 2006156049 A | * | 6/2006 | |
| JP | 2012-248392 A | | 12/2012 | |
| KR | 10-0667946 B1 | | 1/2007 | |
| KR | 10-1146467 B1 | | 5/2012 | |
| KR | 2013086485 A | * | 8/2013 | |
| KR | 20130086485 | * | 8/2013 | .......... H01M 10/052 |
| KR | 10-1323084 B1 | | 10/2013 | |
| KR | 101483422 B1 | * | 1/2015 | |
| KR | 102397762 B1 | * | 6/2017 | ............ H01M 10/04 |
| WO | WO 2018/181950 A1 | | 10/2018 | |
| WO | WO-2020104128 A1 | * | 5/2020 | |

OTHER PUBLICATIONS

Q Li, et. al. Chemistry, Electrochemistry, and Electrochemical Applications: Aluminum, 2009 Elsevier B.V, 695, 705 (Year: 2009).*

European Search Report for corresponding European Application No. 21171203.9, European Search Report mailed Oct. 15, 2021 (9 pgs.).

Chinese Office Action dated Feb. 19, 2024, issued in corresponding Chinese Patent Application No. 202110453300.5 (19 pages, including 11 pages of English translation).

Chinese Office Action dated Sep. 28, 2024, issued in corresponding Chinese Patent Application No. 202110453300.5 (4 pages).

* cited by examiner

BUTTON CELL

CROSS-REFERENCE TO RELATED APPLICATION

This application claims priority to and the benefit of Korean Patent Application No. 10-2020-0078578, filed on Jun. 26, 2020 in the Korean Intellectual Property Office, the entire content of which is incorporated herein by reference.

BACKGROUND

1. Field

Aspects of embodiments of the present disclosure relate to a rechargeable battery.

2. Description of the Related Art

Generally, a rechargeable battery is a battery that can be repeatedly charged and discharged.

In recent years, as a demand for wearable devices, such as headphones, earphones, smartwatches, and body-attached medical devices using a wireless communication such as Bluetooth increases, a need for ultra-small rechargeable batteries installed in the wearable devices is increasing.

An electrode terminal disposed on an outer surface of the ultra-small rechargeable battery is in contact with a contact terminal of the wearable device to supply power to the wearable device, and since an oxide film is naturally formed on the surface of the electrode terminal of the ultra-small rechargeable battery, there is a problem that contact resistance between the electrode terminal of the ultra-small rechargeable battery and the contact terminal of the wearable device is increased.

The above information disclosed in this Background section is only for enhancement of understanding of the background of the invention, and, therefore, it may contain information that does not form the prior art that is already known in this country to a person of ordinary skill in the art.

SUMMARY

According to an aspect of one or more embodiments, a rechargeable battery is provided in which an increase in contact resistance between the rechargeable battery and the contact terminal of the device is suppressed even if an oxide layer is formed on the outer surface of the rechargeable battery.

According to one or more embodiments, a rechargeable battery includes: an electrode assembly including a first electrode, a second electrode, and a separator between the first electrode and the second electrode; a case connected to the first electrode to house the electrode assembly and including an opening to expose the electrode assembly; a cap plate coupled with the case to cover an outer region of the opening and including a through-hole to expose a center region of the opening; and a terminal plate bonded to and insulated from the cap plate to cover the through-hole and connected to the second electrode, wherein the outer surface of the case has a first protrusions-and-depressions shape.

An outer surface of the case may contact an external first contact terminal.

An oxide layer may be between depressions of the first protrusions-and-depressions shape and the first contact terminal, and the oxide layer may not be between protrusions of the first protrusions-and-depressions shape and the first contact terminal.

The first protrusions-and-depressions shape may be formed by etching using a laser beam.

The first protrusions-and-depressions shape may include at least one shape among a comb shape, a checkerboard shape, a circle shape, and an ellipse shape on a plane area.

An outer surface of the cap plate may have a second protrusions-and-depressions shape.

The outer surface of the cap plate may contact an external second contact terminal.

An oxide layer may be between depressions of the second protrusions-and-depressions shape and the second contact terminal, and the oxide layer may not be between protrusions of the second protrusions-and-depressions shape and the second contact terminal.

The terminal plate may include: a terminal part arranged on the cap plate; and a protruded part penetrating the through-hole from the terminal part and connected to the second electrode.

The rechargeable battery may further include a sealing part between the terminal part and the cap plate and bonding between the cap plate and the terminal plate.

An outer surface of the terminal part may have a third protrusions-and-depressions shape.

The outer surface of the terminal part may contact an external third contact terminal.

An oxide layer may be between depressions of the third protrusions-and-depressions shape and the third contact terminal, and the oxide layer may not be between protrusions of the third protrusions-and-depressions shape and the third contact terminal.

The case and the cap plate may have a same polarity as that of the first electrode, and the terminal plate may have a same polarity as that of the second electrode.

The electrode assembly may further include: a first electrode tab extending from the first electrode and coupled with the case; and a second electrode tab extending from the second electrode and coupled with the terminal plate.

According to an exemplary embodiment, even if the oxide layer is formed on the outer surface of the rechargeable battery, the rechargeable battery that suppresses an increase in contact resistance between the rechargeable battery and the contact terminal of the device is provided.

Figure 1:
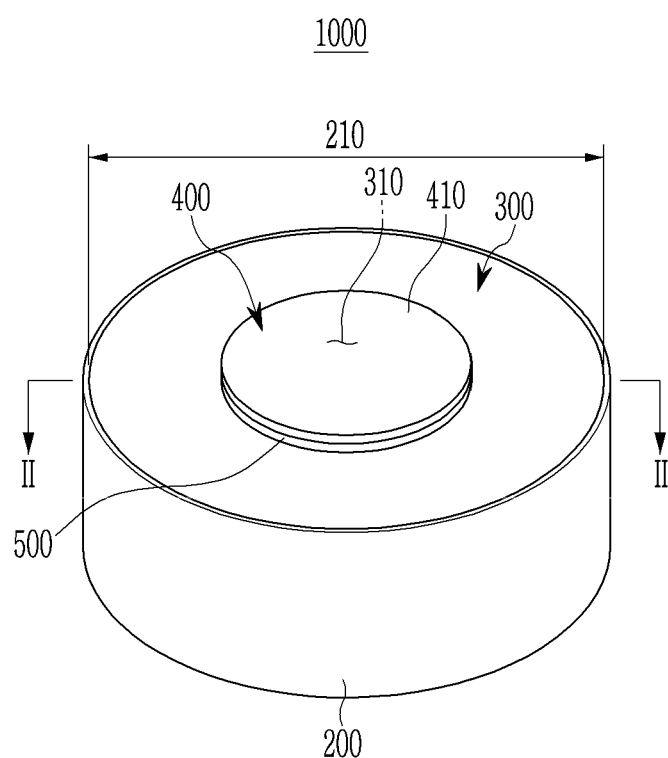
FIG. 1 is a perspective view showing a rechargeable battery according to an embodiment.

| DESCRIPTION OF REFERENCE DESIGNATORS | |
|---|---|
| 100: electrode assembly | 200: case |
| 300: cap plate | 400: terminal plate |
| PD1: first protrusions-and-depressions shape | |

DETAILED DESCRIPTION

The present invention will be described more fully herein with reference to the accompanying drawings, in which some example embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In addition, unless explicitly described to the contrary, it is to be understood that terms such as "comprises," "includes," or "have" used in the present specification specify the presence of stated features, numerals, steps, operations, components, parts, or a combination thereof, but do not preclude the presence or addition of one or more other features, numerals, steps, operations, components, parts, or a combination thereof.

Also, in this specification, it is to be understood that when one component is referred to as being "connected" or "coupled" to another component, it may be connected or coupled directly to the other component or connected or coupled to another component with one or more other components intervening therebetween.

Singular forms are to include plural forms unless the context clearly indicates otherwise.

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Next, a rechargeable battery according to an embodiment is described with reference to FIG. 1 to FIG. 3.

The rechargeable battery according to an embodiment is an ultra-small rechargeable battery and may be a coin-type cell or a button-type cell, but is not limited thereto and, in another embodiment, may be a cylindrical or pin type cell.

Here, the coin-type cell or the button-type cell is a thin coin-type or button-shape cell and may refer to a cell having a ratio of a height to a diameter of 1 or less, however, is not limited thereto. In an embodiment, the coin-type cell or the button-type cell is cylindrical, and a horizontal cross-section is circular, but the present invention is not limited thereto, and, in another embodiment, a horizontal cross-section may be oval or polygonal. At this time, the diameter may refer to the maximum distance based on the horizontal direction of the battery, and the height may refer to the maximum distance (a distance from the flat bottom surface to the flat upmost surface) based on the vertical direction of the battery.

Herein, the coin-type cell or button-type cell that is a rechargeable battery, which may be repeatedly charged and discharged, is described as an example, but, as another example, the coin-type cell or button-type cell capable of only being discharged may also be included in the present invention.

Figure 2:
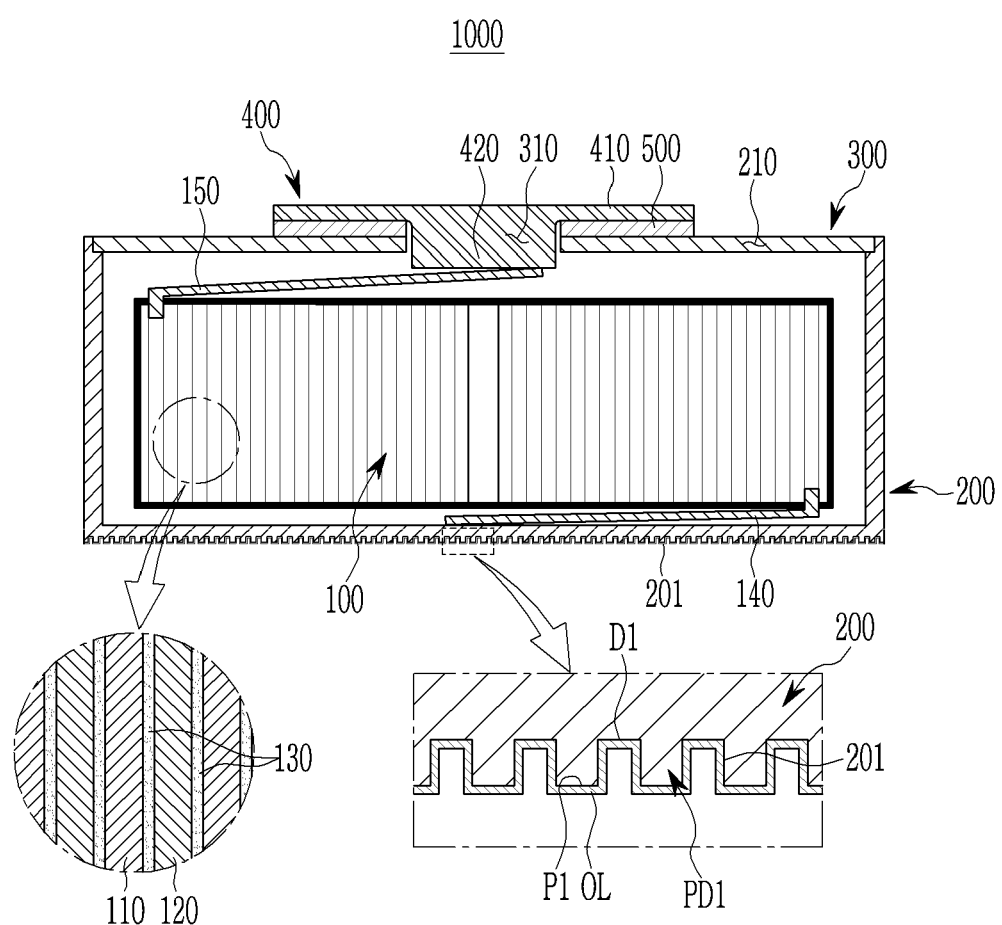
FIG. 2 is a cross-sectional view taken along the line II-II of FIG. 1.

FIG. 1 is a perspective view showing a rechargeable battery according to an embodiment; and FIG. 2 is a cross-sectional view taken along the line II-II of FIG. 1.

Referring to FIG. 1 and FIG. 2, a rechargeable battery 1000 according to an embodiment includes an electrode assembly 100, a case 200, a cap plate 300, a terminal plate 400, and a sealing part 500.

The electrode assembly 100 is housed in the case 200. A lower part of the electrode assembly 100 faces a lower part of the case 200, and an upper part of the electrode assembly 100 faces the cap plate 300 and the terminal plate 400 covering an opening 210 of the case 200. In an embodiment, the upper and lower parts of the electrode assembly 100 may have a planar shape such that they are parallel to each other, but are not limited thereto.

The electrode assembly 100 includes a first electrode 110, a second electrode 120, a separator 130, a first electrode tab 140, and a second electrode tab 150.

The first electrode 110 and the second electrode 120 are separated from each other, and the separator 130 including an insulating material is disposed between the first electrode 110 and the second electrode 120. In an embodiment, the first electrode 110 may be an anode and the second electrode 120 may be a cathode, but the present invention is not limited thereto, and, in another embodiment, the first electrode 110 may be a cathode and the second electrode 120 may be an anode.

In an embodiment, the first electrode 110 has a band shape extending in a direction, and includes an anode coated region of an area where an anode active material layer is coated to a current collector of a metal foil (for example, a Cu foil), and an anode uncoated region of an area where the active material is not coated. The anode uncoated region may be disposed at an end in the extension direction of the first electrode 110.

In an embodiment, the second electrode 120 has a band shape that is spaced apart from the first electrode 110 with the separator 130 interposed therebetween, and extends in a direction and includes a cathode coated region of an area where a cathode active material layer is applied to a current collector of a metal foil (for example, an Al foil), and a cathode uncoated region of an area where the active material is not applied. The cathode uncoated region may be disposed at an end in the extending direction of the second electrode 120.

The separator 130 extends in a direction between the first electrode 110 and the second electrode 120 to prevent or substantially prevent a short circuit between the first electrode 110 and the second electrode 120.

In an embodiment, the first electrode 110, the separator 130, and the second electrode 120 are sequentially stacked and wound in a jelly roll shape, but are not limited thereto and may be formed in any of various shapes. Each of the first electrode 110, the second electrode 120, and the separator 130 may include any of various known materials.

The first electrode tab 140 extends from the first electrode 110 of the electrode assembly 100 to the case 200. The first electrode tab 140 is combined with a lower part of the case

200 to connect the first electrode 110 and the case 200. The first electrode tab 140 is in contact with the first electrode 110 and the case 200. By the first electrode tab 140, the case 200 has a same polarity (for example, an anode polarity) as the first electrode 110.

The second electrode tab 150 extends from the second electrode 120 of the electrode assembly 100 to the terminal plate 400. In an embodiment, the second electrode tab 150 is combined with a protruded part 420 of the terminal plate 400 to connect the second electrode 120 and the terminal plate 400. The second electrode tab 150 is in contact with the second electrode 120 and the terminal plate 400. By the second electrode tab 150, the terminal plate 400 has a same polarity as the second electrode 120 (for example, a cathode polarity).

In an embodiment, a center pin penetrating the center of the electrode assembly 100 in a vertical direction is disposed in a center portion of the electrode assembly 100, and the center pin may support the first electrode tab 140 and the second electrode tab 150, but is not limited thereto.

The case 200 is connected to the first electrode 110 of the electrode assembly 100 and houses the electrode assembly 100. The case 200 includes the opening 210 that exposes the upper part of the electrode assembly 100. The lower part of the case 200 is connected to the first electrode 110 of the electrode assembly 100 by the first electrode tab 140, and has the same polarity (for example, the anode polarity) as the first electrode 110. In an embodiment, the case 200 has a cylinder shape for accommodating the electrode assembly 100 in the form of the jelly roll, but is not limited thereto, and may have any of various shapes. The case 200 may accommodate any of various known electrolyte solutions along with the electrode assembly 100.

A first outer surface 201 of the case 200, which is disposed on the lower side of the case 200, has a first protrusions-and-depressions shape PD1. The first protrusions-and-depressions shape PD1 includes a plurality of first protrusions P1 and a plurality of first depressions D1. First depressions D1 of the plurality of first depressions D1 are respectively disposed between first protrusions P1 of the plurality of first protrusions P1, and first protrusions P1 of the plurality of first protrusions P1 are respectively disposed between first depressions D1 of the plurality of first depressions D1. The plurality of first depressions D1 and the plurality of first protrusions P1 define the first protrusions-and-depressions shape PD1 of the first outer surface 201. The first protrusions-and-depressions shape PD1 may include at least one shape among a comb shape, a checkerboard shape, a circle shape, an ellipse shape, and a polygon shape on a plane, but is not limited thereto. In an embodiment, the first depressions D1 and the first protrusions P1 have a cross-sectional shape of a rectangle or square, but are not limited thereto, and may have any of various cross-sectional shapes, such as any of a triangular shape, a polygonal shape, a circular shape, an elliptical shape, and an irregular shape.

In an embodiment, in the first outer surface 201 of the case 200, any of various identification patterns, such as letters, symbols, and numbers, may be formed in a plane area, and these identification patterns can have a depressed or protruded shape.

In an embodiment, the first protrusions-and-depressions shape PD1 may be formed by etching the first outer surface 201 of the case 200 using a laser beam, but is not limited thereto.

As another example, the first protrusions-and-depressions shape PD1 may be formed by surface-treating the first outer surface 201 of the case 200 using a known MEMS process including photolithography, but is not limited thereto.

In an embodiment, the first outer surface 201 of the case 200 may be an anode terminal of the rechargeable battery 1000, and a contact terminal of a device, such as a wearable device, may be in contact with the first outer surface 201 of the case 200. In an embodiment, an outer surface of the terminal plate 400 may be a cathode terminal of the rechargeable battery 1000, and the other contact terminal of the device may be in contact with the outer surface of the terminal plate 400.

In an embodiment, an oxide layer OL may be formed on the first outer surface 201 of the case 200 due to natural oxidation, but is not limited thereto.

In an embodiment, the case 200 includes stainless steel, but is not limited thereto, and may include a metal, such as any of aluminum, nickel, and copper.

The opening 210 of the case 200 is covered by the cap plate 300 and the terminal plate 400.

The cap plate 300 covers the outer region of the opening 210 in combination with the case 200. The cap plate 300 includes a through-hole 310 that exposes the center region of the opening 210. In an embodiment, the cap plate 300 covers the outer region of the opening 210 by being directly coupled to the side wall of the case 200, which forms the opening 210 of the case 200, by a welding process. In an embodiment, the cap plate 300 has a ring shape by the through-hole 310 formed in the center, but is not limited thereto. The cap plate 300 is combined with case 200 and has the same polarity (for example, the anode polarity) as the first electrode 110.

In an embodiment, the cap plate 300 includes stainless steel, but is not limited thereto, and may include a metal, such as any of aluminum, nickel, and copper.

The terminal plate 400 is insulated from and combined to the cap plate 300 to cover the through-hole 310 of the cap plate 300. In an embodiment, the terminal plate 400 is disposed on the cap plate 300, but is not limited thereto, and may be disposed between the cap plate 300 and the electrode assembly 100. The terminal plate 400 covers the center region of the opening 210 of the case 200 exposed by the through-hole 310 of the cap plate 300. In an embodiment, since the terminal plate 400 covers the center region of the opening 210 and the cap plate 300 covers the outer region of the opening 210, the opening 210 of the case 200 is completely covered by the terminal plate 400 and the cap plate 300. The terminal plate 400 is connected to the second electrode tab 150 of the electrode assembly 100 to be connected to the second electrode 120 of the electrode assembly 100. The terminal plate 400 has the same polarity (for example, the cathode polarity) as the second electrode 120.

The terminal plate 400 includes a terminal part 410 and a protruded part 420.

The terminal part 410 is disposed on the cap plate 300 and overlaps the cap plate 300. The terminal part 410 has a wider area than the protruded part 420. For example, the terminal part 410 may have a larger diameter than the protruded part 420. A lower surface of the terminal part 410 is in contact with the sealing part 500, and the terminal part 410 is insulated from and bonded to the cap plate 300 by the sealing part 500.

The protruded part 420 is protruded from the terminal part 410 corresponding to the through-hole 310 of the cap plate 300 and penetrates the through-hole 310. The lower surface of the protruded part 420 is in contact with the second electrode tab 150. As the protruded part 420 is combined with the second electrode tab 150, the terminal plate 400 has the same polarity as the second electrode 120.

In an embodiment, the terminal plate 400 includes aluminum, but is not limited thereto, and may include a metal, such as any of stainless steel, nickel, and copper.

The sealing part 500 is disposed between the cap plate 300 and the terminal part 410 of the terminal plate 400 and insulatively bonds the cap plate 300 and the terminal plate 400. The sealing part 500 includes an insulating material and insulates between the cap plate 300 and the terminal plate 400. In an embodiment, the sealing part 500 may be thermally fused between the cap plate 300 and the terminal part 410 of the terminal plate 400 by using heat or a laser beam, or may be inserted between the cap plate 300 and the terminal part 410 of the terminal plate 400, however it is not limited thereto. The sealing part 500 may include any of various known materials for insulating and bonding between the cap plate 300 and the terminal plate 400. As the sealing part 500 bonds between the cap plate 300 and the terminal plate 400, the opening 210 of the case 200 is completely sealed by the cap plate 300, the terminal plate 400, and the sealing part 500.

Figure 3:
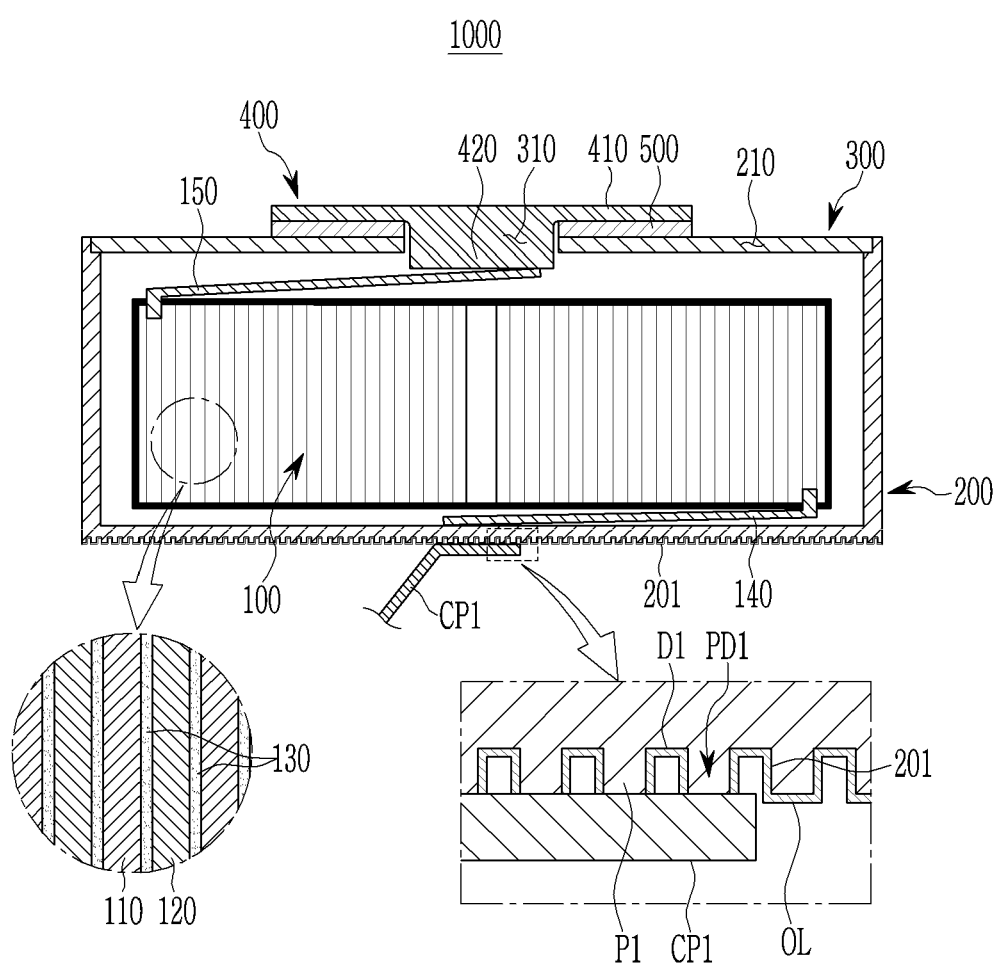
FIG. 3 is a cross-sectional view showing a first contact terminal in contact with an outer surface of a case of a rechargeable battery according to an embodiment.

FIG. 3 is a cross-sectional view showing a first contact terminal in contact with an outer surface of a case of a rechargeable battery according to an embodiment.

Referring to FIG. 3, an external first contact terminal CP1, which may be one contact terminal of a device, is in contact with the first outer surface 201 of the case 200, which may be the anode terminal of the rechargeable battery 1000. In an embodiment, the other contact terminal of the device may be in contact with the outer surface of the terminal plate 400, which may be the cathode terminal of the rechargeable battery 1000. The first contact terminal CP1 may have a plate or a pin shape, but is not limited thereto and may have any of various known shapes.

Due to the first protrusions-and-depressions shape PD1 in the first outer surface 201 of the case 200, a plurality of first protrusions P1 included in the first protrusions-and-depressions shape PD1 are in contact with the first contact terminal CP1, such that the contact area between the first outer surface 201 of the case 200 and the first contact terminals CP1 is decreased, and, thereby, pressure between the first outer surface 201 of the case 200 and the first contact terminal CP1 is increased. As the pressure between the first outer surface 201 of the case 200 and the first contact terminal CP1 is increased, the oxide layer OL formed at the first outer surface 201 may be destroyed by the pressure between the first outer surface 201 and the first contact terminal CP1 and separated from the first outer surface 201, and the first protrusions P1 of the first outer surface 201 may be in direct contact with the first contact terminal CP1.

In an embodiment, the oxide layer OL is disposed between the first depressions D1 of the first protrusions-and-depressions shape PD1 and the first contact terminal CP1, and the oxide layer OL is destroyed between the first protrusions P1 of the first protrusions-and-depressions shape PD1 and the first contact terminal CP1 by the pressure and is not disposed therebetween.

That is, even if the oxide layer OL is formed on the first outer surface 201 of the case 200 of the rechargeable battery 1000, as the contact area between the first outer surface 201 and the first contact terminal CP1 is decreased by the first protrusions-and-depressions shape PD1 and the pressure between the first outer surface 201 and the first contact terminal CP1 is increased, since the oxide layer OL formed on the surface of the first protrusions P1 of the first protrusions-and-depressions shape PD1 of the first outer surface 201 may be destroyed by the pressure and the first protrusions P1 of the first outer surface 201 may be in direct contact with the first contact terminal CP1, an increase in contact resistance between the first outer surface 201 of the case 200, which may be the anode terminal of the rechargeable battery 1000, and the first contact terminal CP1 of the device, may be suppressed.

Also, even if a contact probe is in contact with the first outer surface 201 of the case 200 for a test of the rechargeable battery 1000, as the contact area between the first outer surface 201 and the contact probe is decreased by the first protrusions-and-depressions shape PD1 and the pressure between the first outer surface 201 and the contact probe is increased, since the oxide layer OL formed on the surface of the first protrusions P1 of the first protrusions-and-depressions shape PD1 of the first outer surface 201 is destroyed by the pressure and the first protrusions P1 of the first outer surface 201 are in direct contact with the contact probe, an increase in contact resistance between the first outer surface 201 of the case 200, which may be the anode terminal the rechargeable battery 1000, and the contact probe is suppressed, thereby improving the test reliability for the rechargeable battery 1000.

That is, even if the oxide layer OL is formed on the first outer surface 201 of the case 200 which is the outer surface of the rechargeable battery 1000, the rechargeable battery 1000 is provided in which both an increase in contact resistance between the rechargeable battery 1000 and the first contact terminal CP1 of the device is suppressed and an increase in contact resistance between the rechargeable battery 1000 and the contact probe for the test of the rechargeable battery 1000 is suppressed.

Next, a rechargeable battery according to another embodiment is described with reference to FIG. 4.

Herein, parts that are different from those of the rechargeable battery according to an embodiment described above are mainly described.

Figure 4:
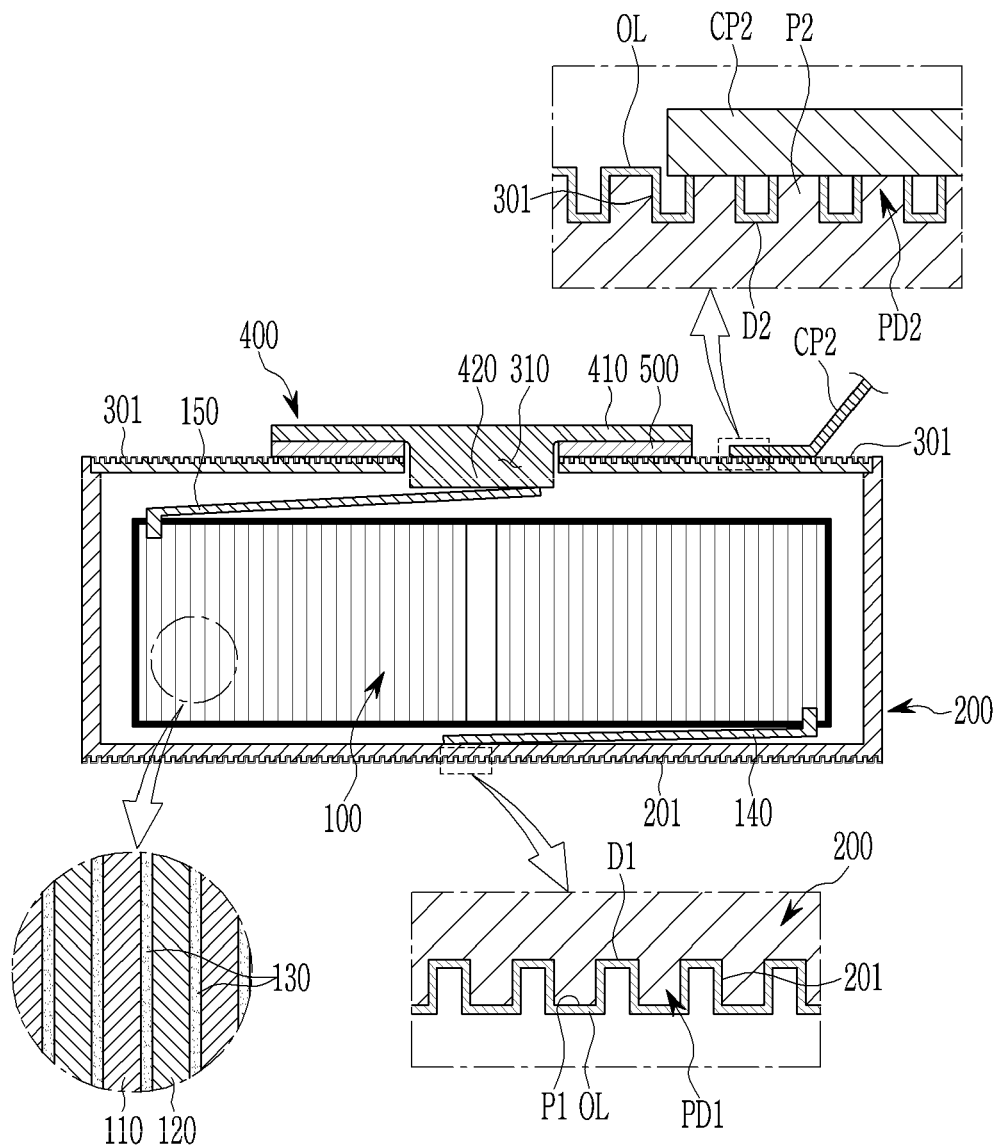
FIG. 4 is a cross-sectional view of a rechargeable battery according to another embodiment.

FIG. 4 is a cross-sectional view showing a rechargeable battery according to another embodiment.

Referring to FIG. 4, a rechargeable battery 1002 according to another embodiment includes an electrode assembly 100, a case 200, a cap plate 300, a terminal plate 400, and a sealing part 500.

A second outer surface 301 of the cap plate 300 disposed at the upper side of the cap plate 300 has a second protrusions-and-depressions shape PD2. The second protrusions-and-depressions shape PD2 includes a plurality of second protrusions P2 and a plurality of second depressions D2. Second depressions D2 of the plurality of second depressions D2 are respectively disposed between second protrusions P2 of the plurality of second protrusions P2, and second protrusions P2 of the plurality of second protrusions P2 are respectively disposed between second depressions D2 of the plurality of second depressions D2. The plurality of second depressions D2 and the plurality of second protrusions P2 define the second protrusions-and-depressions shape PD2 of the second outer surface 301. The second protrusions-and-depressions shape PD2 may include at least one shape among a comb shape, a checkerboard shape, a circle shape, an ellipse shape, and a polygon shape on a plane area, but it is not limited thereto. The second depressions D2 and the second protrusions P2 may have a cross-section of a rectangular or square shape, but are not limited thereto, and may have any of various cross-sectional shapes, such as any of a triangular shape, a polygonal shape, a circular shape, an elliptical shape, and an irregular shape.

In an embodiment, on the second outer surface 301 of the cap plate 300, any of various identification patterns, such as letters, symbols, and numbers, may be formed on a plane area, and these identification patterns may have a depressed or embossed shape.

In an embodiment, the second protrusions-and-depressions shape PD2 may be formed by etching the second outer surface 301 of the cap plate 300 using a laser beam, but is not limited thereto.

In an embodiment, an oxide layer OL may be formed on the second outer surface 301 of the cap plate 300 due to natural oxidation, but is not limited thereto.

An external second contact terminal CP2, which may be one contact terminal of a device, is in contact with the second outer surface 301 of the cap plate 300, which may be the anode terminal of the rechargeable battery 1002. In an embodiment, the other contact terminal of the device may be in contact with the outer surface of the terminal plate 400, which may be the cathode terminal of the rechargeable battery 1002.

Due to the second protrusions-and-depressions shape PD2 in the second outer surface 301 of the cap plate 300, a plurality of second protrusions P2 included in the second protrusions-and-depressions shape PD2 are in contact with the second contact terminal CP2, the contact area between the second outer surface 301 of the cap plate 300 and the second contact terminal CP2 is decreased, and the pressure between the second outer surface 301 of the cap plate 300 and the second contact terminal CP2 is increased. As the pressure is increased between the second outer surface 301 of the cap plate 300 and the second contact terminal CP2, the oxide layer OL formed on the second outer surface 301 may be destroyed by the pressure between the second outer surface 301 and the second contact terminal CP2 and may be separated from the second outer surface 301, such that the second protrusions P2 of the second outer surface 301 are in direct contact with the second contact terminal CP2.

In an embodiment, the oxide layer OL is disposed between the second depressions D2 of the second protrusions-and-depressions shape PD2 and the second contact terminal CP2, and the oxide layer OL is destroyed between the second protrusions P2 of the second protrusions-and-depressions shape PD2 and the second contact terminal CP2 by the pressure and is not disposed therebetween.

That is, even if the oxide layer OL is formed on the second outer surface 301 of the cap plate 300 of the rechargeable battery 1002, as the contact area between the second outer surface 301 and the second contact terminal CP2 is decreased by the second protrusions-and-depressions shape PD2 and the pressure between the second outer surface 301 and the second contact terminal CP2 is increased, since the oxide layer OL formed on the surface of the second protrusions P2 of the second protrusions-and-depressions shape PD2 of the second outer surface 301 is destroyed by the pressure and the second protrusions P2 of the second outer surface 301 are in direct contact with the second contact terminal CP2, an increase in contact resistance between the second outer surface 301 of the cap plate 300, which may be the anode terminal of the rechargeable battery 1002, and the second contact terminal CP2 of the device, is suppressed.

Also, even if a contact probe is in contact to the second outer surface 301 of the cap plate 300 for testing of the rechargeable battery 1002, as the contact area between the second outer surface 301 and the contact probe is decreased by the second protrusions-and-depressions shape PD2 and the pressure between the second outer surface 301 and the contact probe is increased, since the oxide layer OL formed on the surface of the second protrusions P2 of the second protrusions-and-depressions shape PD2 of the second outer surface 301 is destroyed by the pressure and the second protrusions P2 of the second outer surface 301 are in direct contact with the contact probe, an increase in contact resistance between the second outer surface 301 of the cap plate 300, which may be the anode terminal the rechargeable battery 1002, and the contact probe, is suppressed, thereby improving the test reliability for the rechargeable battery 1002.

That is, even if the oxide layer OL is formed on the second outer surface 301 of the cap plate 300 which is the outer surface of the rechargeable battery 1002, the rechargeable battery 1002 is provided in which both an increase in contact resistance between the rechargeable battery 1002 and the second contact terminal CP2 of the device is suppressed and an increase in contact resistance between the rechargeable battery 1002 and the contact probe for the test of the rechargeable battery 1002 is suppressed.

Also, as the second outer surface 301 of the cap plate 300 of the rechargeable battery 1002 includes the second protrusions-and-depressions shape PD2, since the bonding area between the second outer surface 301 of the cap plate 300 and the sealing part 500 is increased, a bonding force between the terminal plate 400 and the cap plate 300 by the sealing part 500 is improved.

Next, a rechargeable battery according to another embodiment is described with reference to FIG. 5.

Herein, parts that are different from those of the rechargeable battery according to an embodiment described above are mainly described.

Figure 5:
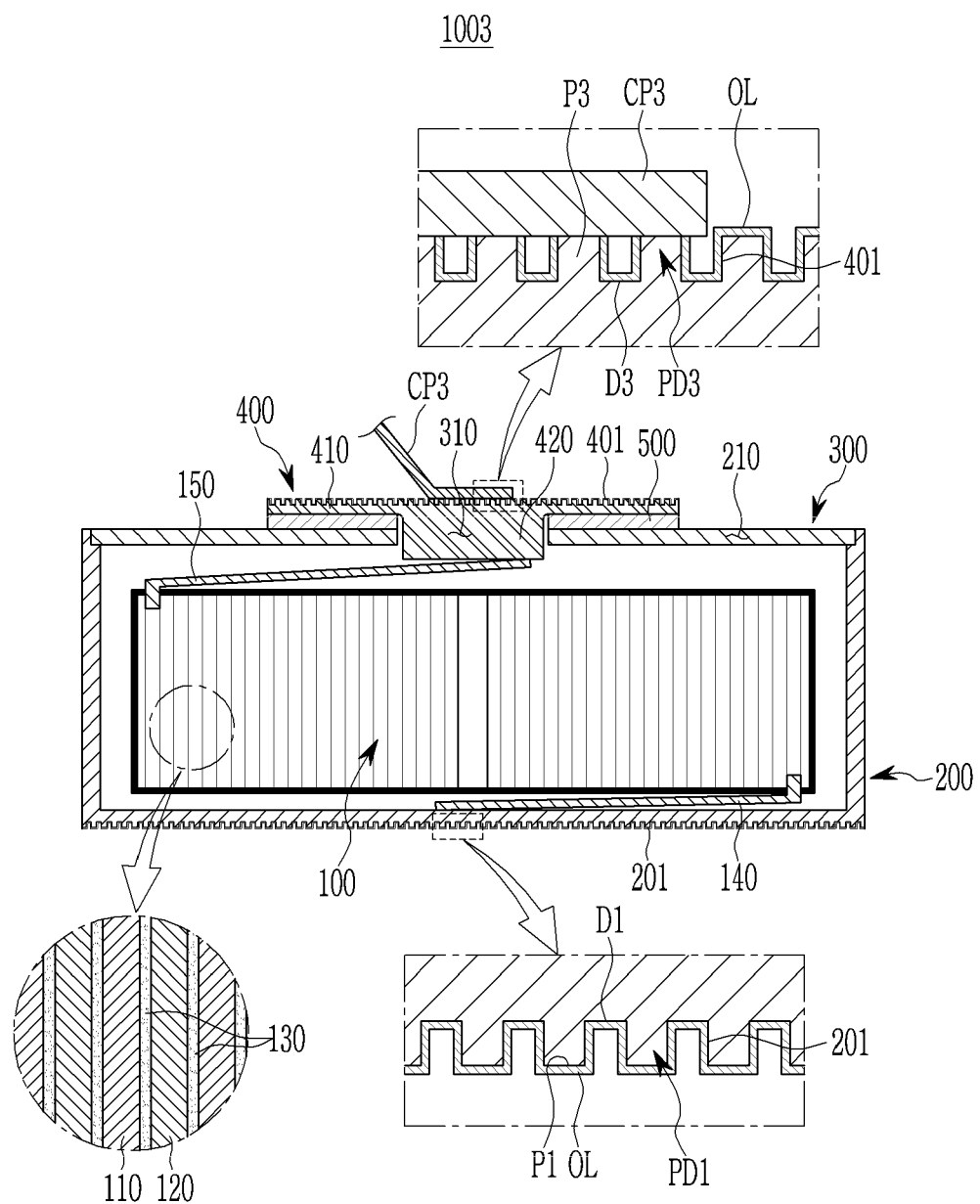
FIG. 5 is a cross-sectional view of a rechargeable battery according to another embodiment.

FIG. 5 is a cross-sectional view showing a rechargeable battery according to another embodiment.

Referring to FIG. 5, a rechargeable battery 1003 according to another embodiment includes an electrode assembly 100, a case 200, a cap plate 300, a terminal plate 400, and a sealing part 500.

A third outer surface 401 of the terminal part 410 of the terminal plate 400 disposed at an upper side of the terminal part 410 of the terminal plate 400 has a third protrusions-and-depressions shape PD3. The third protrusions-and-depressions shape PD3 includes a plurality of third protrusions P3 and a plurality of third depressions D3. Third depressions D3 of the plurality of third depressions D3 are respectively disposed between third protrusions P3 of the plurality of third protrusions P3, and third protrusions P3 of the plurality of third protrusions P3 are respectively disposed between third depressions D3 of the plurality of third depressions D3. The plurality of third depressions D3 and the plurality of third protrusions P3 define the third protrusions-and-depressions shape PD3 of the third outer surface 401. The third protrusions-and-depressions shape PD3 may include at least one shape among a comb shape, a checkerboard shape, a circle shape, an ellipse shape, and a polygon shape on a plane area, but it is not limited thereto. In an embodiment, the third depressions D3 and the third protrusions P3 have a cross-section of a rectangular or square shape, but are not limited thereto, and may have any of various cross-sectional shapes, such as any of a triangular shape, a polygonal shape, a circular shape, an elliptical shape, and an irregular shape.

In an embodiment, the third protrusions-and-depressions shape PD3 may be formed by etching the third outer surface 401 of the terminal part 410 of the terminal plate 400 using a laser beam, but is not limited thereto.

In an embodiment, an oxide layer OL may be formed on the third outer surface 401 of the terminal part 410 of the terminal plate 400, but is not limited thereto.

In an embodiment, an external third contact terminal CP3, which may be one contact terminal of a device, is in contact with the third outer surface 401 of the terminal part 410 of the terminal plate 400, which may be the cathode terminal of the rechargeable battery 1003. In an embodiment, the other contact terminal of the device may be in contact with the first outer surface 201 of the case 200, which may be the anode terminal of the rechargeable battery 1003.

Due to the third protrusions-and-depressions shape PD3 in the third outer surface 401 of the terminal part 410 of the terminal plate 400, a plurality of third protrusions P3 included in the third protrusions-and-depressions shape PD3 are in contact with the third contact terminal CP3 and the contact area between the third outer surface 401 of the terminal part 410 of the terminal plate 400 and the third contact terminal CP3 is decreased, and the pressure between the third outer surface 401 of the terminal part 410 of the terminal plate 400 and the third contact terminal CP3 is increased. As the pressure between the third outer surface 401 of the terminal part 410 of the terminal plate 400 and the third contact terminal CP3 is increased, the oxide layer OL formed on the third outer surface 401 may be destroyed by the pressure between the third outer surface 401 and the third contact terminal CP3 and separated from the third outer surface 401, and third protrusions P3 of the third outer surface 401 may be in direct contact with the third contact terminal CP3.

In an embodiment, the oxide layer OL is disposed between the third depressions D3 of the third protrusions-and-depressions shape PD3 and the third contact terminal CP3, and the oxide layer OL is destroyed by the pressure and is not disposed between the third protrusions P3 of the third protrusions-and-depressions shape PD3 and the third contact terminal CP3.

That is, even if the oxide layer OL is formed on the third outer surface 401 of the terminal part 410 of the terminal plate 400 of the rechargeable battery 1003, as the contact area between the third outer surface 401 and the third contact terminal CP3 is decreased due to the third protrusions-and-depressions shape PD3 and the pressure between the third outer surface 401 and the third contact terminal CP3 is increased, since the oxide layer OL formed on the surface of the third protrusions P3 of the third protrusions-and-depressions shape PD3 of the third outer surface 401 is destroyed by the pressure and the third protrusions P3 of the third outer surface 401 are in direct contact with the third contact terminal CP3, an increase in contact resistance between the third outer surface 401 of the terminal part 410 of the terminal plate 400, which may be the cathode terminal of the rechargeable battery 1003, and the third contact terminal CP3 of the device, is suppressed.

Also, even if a contact probe is in contact with the third outer surface 401 of the terminal part 410 of the terminal plate 400 for testing of the rechargeable battery 1003, as the contact area between the third outer surface 401 and the contact probe is decreased due to the third protrusions-and-depressions shape PD3 and the pressure between the third outer surface 401 and the contact probe is increased, since the oxide layer OL formed on the surface of the third protrusions P3 of the third protrusions-and-depressions shape PD3 of the third outer surface 401 is destroyed by the pressure and the third protrusions P3 of the third outer surface 401 are in direct contact with the contact probe, an increase in the contact resistance between the contact probe and the third outer surface 401 of the terminal part 410 of the terminal plate 400, which may be the anode terminal of the rechargeable battery 1003, is suppressed, thereby improving the reliability of the test for the rechargeable battery 1003.

That is, even if the oxide layer OL is formed on the third outer surface 401 of the terminal part 410 of the terminal plate 400 which is the outer surface of the rechargeable battery 1003, the rechargeable battery 1003 is provided in which both an increase in contact resistance between the rechargeable battery 1003 and the third contact terminal CP3 of the device is suppressed and an increase in contact resistance between the rechargeable battery 1003 and the contact probe for the test of the rechargeable battery 1003 is suppressed.

While the present invention has been described in connection with what are presently considered to be some practical embodiments, it is to be understood that the invention is not limited to the disclosed embodiments. On the contrary, it is intended to cover various modifications and equivalent arrangements included within the spirit and scope of the appended claims.

What is claimed is:
1. A button cell comprising:
an electrode assembly comprising a first electrode, a second electrode, and a separator between the first electrode and the second electrode;
a case connected to the first electrode to house the electrode assembly and comprising an opening to receive the electrode assembly;
a cap plate coupled with the case to cover an outer region of the opening and comprising a through-hole to expose a center region of the opening; and
a terminal plate bonded to and insulated from the cap plate to cover the through-hole and connected to the second electrode,
wherein an outer surface of the case that is opposite the cap plate is a terminal of the button cell and has a first protrusions-and-depressions shape,
wherein a first oxide layer is located on protrusions of the first protrusions-and-depressions shape and within depressions of the first protrusions-and-depressions shape, and the first oxide layer is removable from first protrusions of the protrusions so as to remain within first depressions of the depressions that are between the first protrusions by pressure between the first protrusions and an external contact terminal or a test probe configured to removably contact the first protrusions wherein the outer surface of the case contacts an external first contact terminal.

2. The button cell of claim 1, wherein
the first oxide layer is between the depressions of the first protrusions-and-depressions shape and the first contact terminal, and
the first oxide layer is not between the protrusions of the first protrusions-and-depressions shape and the first contact terminal.

3. The button cell of claim 1, wherein the first protrusions-and-depressions shape is formed by etching using a laser beam.

4. The button cell of claim 1, wherein the first protrusions-and-depressions shape comprises at least one shape among a comb shape, a checkerboard shape, a circle shape, and an ellipse shape on a plane area.

5. The button cell of claim 1, wherein an outer surface of the cap plate has a second protrusions-and-depressions shape.

6. The button cell of claim 5, wherein the outer surface of the cap plate contacts an external second contact terminal.

7. The button cell of claim 6, wherein
a second oxide layer is between depressions of the second protrusions-and-depressions shape and the second contact terminal, and
the second oxide layer is not between protrusions of the second protrusions-and-depressions shape and the second contact terminal.

8. The button cell of claim 1, wherein the terminal plate comprises:
a terminal part arranged on the cap plate; and
a protruded part penetrating the through-hole from the terminal part and connected to the second electrode.

9. The button cell of claim 8, further comprising a sealing part between the terminal part and the cap plate and bonding between the cap plate and the terminal plate.

10. The button cell of claim 8, wherein an outer surface of the terminal part has a third protrusions-and-depressions shape.

11. The button cell of claim 10, wherein the outer surface of the terminal part contacts an external third contact terminal.

12. The button cell of claim 11, wherein
a third oxide layer is between depressions of the third protrusions-and-depressions shape and the third contact terminal, and
the third oxide layer is not between protrusions of the third protrusions-and-depressions shape and the third contact terminal.

13. The button cell of claim 1, wherein
the case and the cap plate have a same polarity as that of the first electrode, and
the terminal plate has a same polarity as that of the second electrode.

14. The button cell of claim 1, wherein the electrode assembly further comprises:
a first electrode tab extending from the first electrode and coupled with the case; and
a second electrode tab extending from the second electrode and coupled with the terminal plate.

* * * * *